United States Patent [19]
Donoho et al.

[11] Patent Number: 6,135,156
[45] Date of Patent: Oct. 24, 2000

[54] TUBING CLOSURE

[75] Inventors: James D. Donoho, Monticello; Todd Maciej, Carver; Eric G. Soderstrom, Lauderdale, all of Minn.

[73] Assignee: Fluoroware, Inc., Chaska, Minn.

[21] Appl. No.: 09/253,628

[22] Filed: Feb. 19, 1999

[51] Int. Cl.[7] .............................. F16L 55/10; F16L 11/00
[52] U.S. Cl. .............................................. 138/89; 138/109
[58] Field of Search ..................................... 215/273, 274, 215/276, 283; 220/327, 319, 315, 255, 256; 138/96 T, 89, 109

[56] References Cited

U.S. PATENT DOCUMENTS

| | | | |
|---|---|---|---|
| 4,176,755 | 12/1979 | Winchell | 215/276 |
| 4,679,696 | 7/1987 | Bonnenfant et al. | 215/276 |
| 4,896,782 | 1/1990 | Hawkins et al. | 215/276 |

Primary Examiner—Andres Kashnikow
Assistant Examiner—Davis Hwu
Attorney, Agent, or Firm—Patterson, Thuente, Skaar & Christensen, P.A.

[57] ABSTRACT

The tube closure comprises a cap and a nut which work in concert with each other to effectively seal a nipple at the end of a threaded tube or pipe and which facilitate removal of the cap. The cap has a flared end portion, a narrowed neck portion, a head portion, and an inner cylindrical sealing surface which engages the nipple. The cap is removably engaged within the nut with the nut at the neck portion, and is sealingly engaged on a cylindrical surface of the nipple. The cap may be removed from the nut by withdrawing the head through the nut, with an axial separation force. Removal of the cap from the nipple requires an axial cap removal force. The required axial separation force is greater than the cap removal force. The engagement of the cap within the nut allows the unscrewing of the nut to provide an axial force on the cap to disengage the cap from the nipple without separating the nut from the cap.

15 Claims, 2 Drawing Sheets

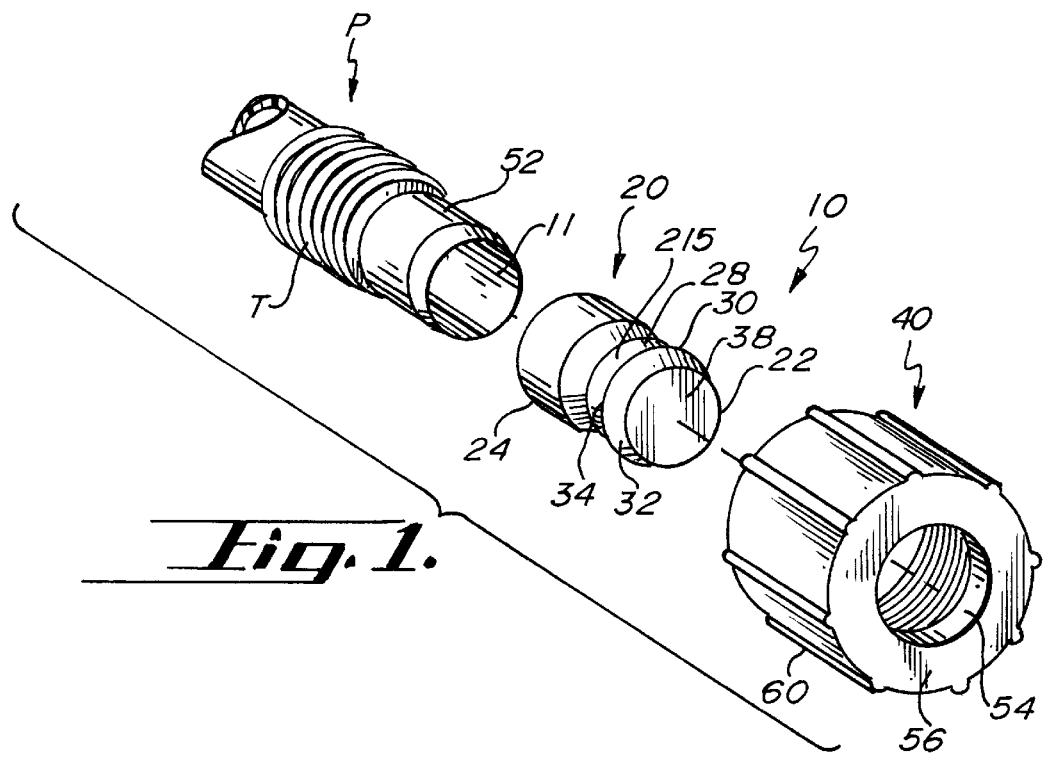
_Fig. 1._
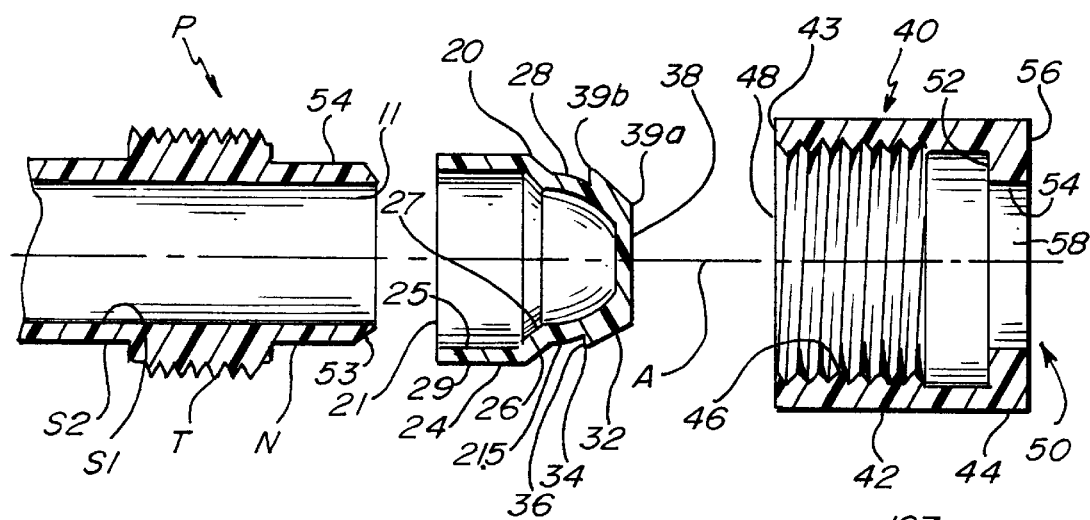
_Fig. 2._
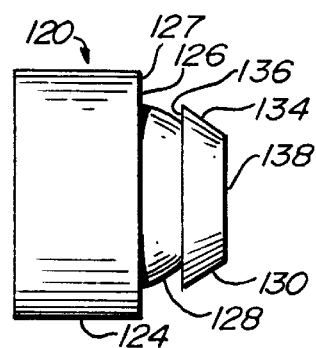
_Fig. 6._

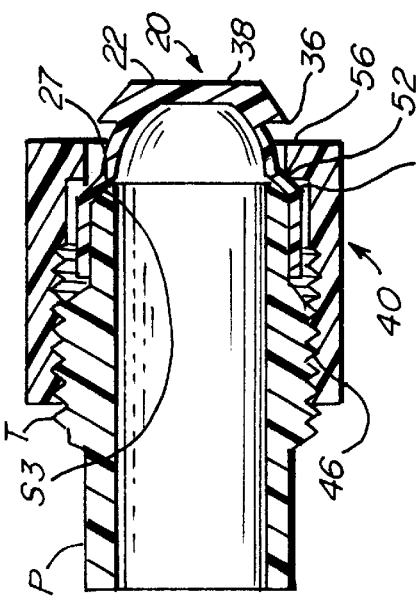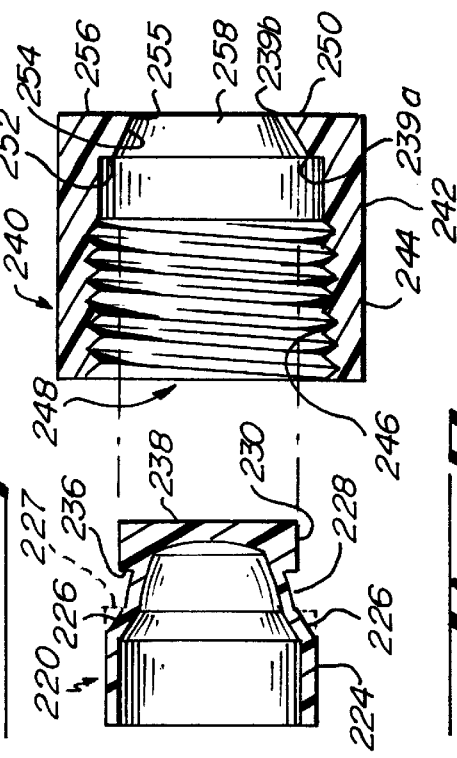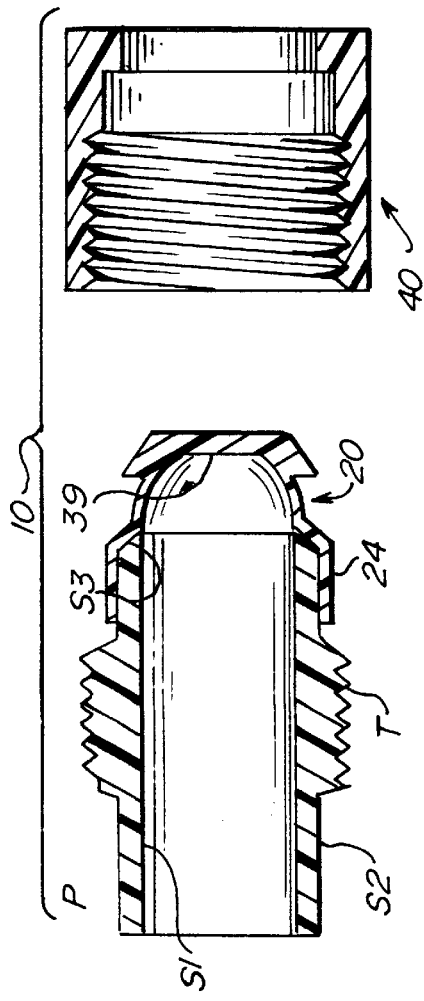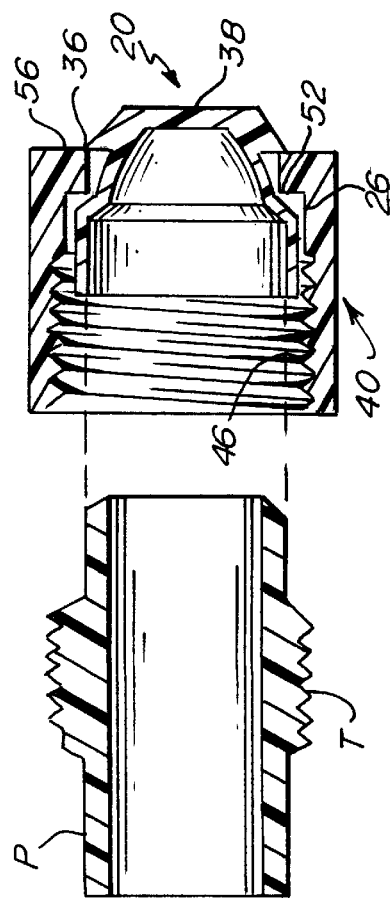

TUBING CLOSURE

BACKGROUND OF THE INVENTION

This invention relates to closures in general and tube or pipe end closures for threaded plastic pipes in particular.

Plastic piping is used in many industrial settings. It is lightweight, easy to fabricate, relatively inexpensive, and non-reactive to many materials. Plastics have particular relevance in the semiconductor fabrication industry where ultra-pure conditions are often required. Piping systems are usually laid out in anticipation of future additions or modifications. This makes it relatively easy to tie into or remove portions of the system as required. For example, a space reserved for a future addition such as a processing apparatus may be terminated close to where the anticipated connection is to be located. Normally, when temporarily tying off or closing a pipe or tube, particularly a pipe or tube with threaded ends, the pipe end is provided with a threaded cap or a valve. These devices of temporarily closing off a pipe end have their drawbacks. With threaded caps, sealing is accomplished by the threads or a gasket material, or a combination of threads and a gasket material. This approach does not work particularly well in semiconductor fabrication situations which require corrosive and/or high temperature fluids. Corrosive fluids used in semiconductor processing often reacts with piping and gaskets causing degradation and leaching, which in turn contaminates the fluid. High temperatures speed up the process of degradation. Further, for high pressure situations, a cap will be torqued tighter onto the pipe increasing the possibility of damage to threads of both the pipe and the cap and/or mechanical abrasion which creates contamination. Valves are acceptable, but expensive. Even with valves, when the tube or pipe end is subsequently connected to other devices, additional connectors and their attendant tools are often required to enable attachment to the original pipe or tube. This requires additional fixtures and man hours to connect the various components.

Closures are known which utilize a nut to secure a flared cap on a ripple. With removal of the nut, the flared cap stays on the nipple until a sufficient axial cap removal force is applied. Such caps are often difficult to grasp by hand and gripping tools can damage the plastic parts.

The present invention solves the problems inherent to the above-mentioned methods of capping or tying off a tube or pipe end by providing a tube closure which works in concert with existing pipe fittings and facilitates removal of the cap.

Another object of the invention is to create smooth interior transitions between a pipe or tube and a closure.

It is an object of the present invention to provide a twopiece closure mechanism for a pipe or tube end which may be easy manufactured by injection molding.

Another object of the invention is to provide a snug fitting cap for a pipe or tube end.

Another object of the invention is to facilitate removal of a snug fitting cap from a pipe or tube end.

Yet another object is to permit temporary retention of a cap onto a pipe or tube end by a retainer or nut.

Another object of the present invention is to enable a pipe or tube end to be closed or tied off without the assistance of tools.

Still another object of the present invention to eliminate the use of gasket material in a pipe or tube closure.

Another object of the invention is to increase the amount of sealing area between a pipe or tube and a closure mechanism.

Still another object of the invention is to provide a contaminant-free closure for a pipe or tube end.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The tube closure comprises two parts, a cap and a nut or retainer, which work in concert with each other to effectively seal the end of a threaded tube or pipe and which facilitate removal.

The cap comprises a skirt or flared end portion, a neck portion, and a head portion or end section. The skirt is sized to enable the cap to be snugly retained onto a pipe or tube end, and the cover or end section comprises a series of concentrically-shaped rings which terminate in a head. Adjacent the head is an annular ring which includes a camming surface and a tip portion. As discussed below, the camming surface and the tip enable the cap to be removed from the pipe or tube end.

The nut or retainer comprises a sleeve having a first end and a second end, and a collar. The first end of the sleeve defines a first aperture, which is sized to freely admit the cap. A portion of the interior of the sleeve is provided with fastening elements to enable the sleeve to be releasably attached to a pipe or tube, and to enable the sleeve to exert an axial force on the cap. The second end of the sleeve is provided with a collar which includes a first contacting surface, a land and a second contacting surface. The land defines a second aperture which is sized to frictionally admit the head and its adjacent concentric ring.

There are two aspects or functions of the pipe closure. First, the cap and the nut cooperate with each other to effectively seal an end of a tube. In this aspect a cap is placed on a pipe end to be closed so that the lower portion of the skirt encircles the pipe end. Then the nut is placed over the cap far enough to enable the fastening elements of the sleeve and the pipe end to engage each other. The nut is then tightened so that an axial force is placed on the cap by the first contacting surface on another annular ring on the cap, thus closing off and sealing the end of the pipe. In closing off the pipe, the head and its adjacent concentrically-shaped ring frictionally pass through the second aperture. This is accomplished by deflection of a tip portion on the concentrically-shaped ring. This deflection is facilitated by a camming surface on the concentrically-shaped ring. Once the tip portion passes through the second aperture, it resumes its normal configuration.

In the second aspect, the cap and the nut cooperate with each other while they are being removed or uncoupled from the tube. Here, as the nut is loosened, the second contacting surface of the nut engages a ledge formed by the tip portion of the cap. Since there is no camming surface, the tip portion does not allow the cap to easily pass through the second aperture of the nut. Thus, as the nut is removed from the pipe, the nut provides an axial force acting on the cap. When said force exceeds an axial cap removal force the cap is disengaged from the end of the tube. The axial cap removal force depends on the interference fit between the tube end and the cap as well as adhesion between the respective engaging surfaces. Because the cap is removed in an axial direction, there is no binding or pinching which would make removal more difficult. After the nut and the cap have been removed, the cap can be easily separated from the nut by providing an axial separation force. The axial separation force is greater than the axial cap removal force.

Note that the parts are depicted in conjunction with a tube for better understanding. The combination effectively seals the pipe or tube end.

BRIEF DESCRIPTION OF THE DRAWINGS

FIG. 1 shows an exploded perspective view of the pipe or tube closure of the present invention.

FIG. 2 shows an exploded cross-sectional view of the tube closure of the present invention.

FIG. 3 shows a cross-sectional view of a cap which has been positioned onto a tube.

FIG. 4 shows a cross-sectional view of a tube closure as it is attached onto a tube.

FIG. 5 shows a cross-sectional view of the tube closure of the present invention after it is removed from a tube.

FIG. 6 is plan view of an alternative embodiment of a tube closure cap.

FIG. 7 is a cross-sectional view of an alternative embodiment of a tube closure.

DETAILED SPECIFICATION

As depicted in FIG. 1, the plastic tube closure is generally identified with the numeral 10 and is for closing the open end 11 of a tube or pipe "p". Tube closure 10 comprises two parts, a cap 20 and a nut or retainer 40. The cap 20 has an open end 21, tubular engagement portion 24 configured as a flared end portion or a skirt, a neck portion, 21.5, and a head portion or closed end section 22. The skirt 24 is cylindrical in shape and has an interior surface 25 sized to form an interference fit with a tube end configured as a nipple. The cover or closed end section 22 extends along the longitudinal axis A of skirt 24 and effectively closes one end of the skirt 24, thus forming cap 20. The cover or closed end section 22 comprises a first annular ring or shoulder comprising a retaining force receiving surface 26, an adjacent second annular ring 28, a third annular ring 30, and a head 38 at the closed end section 22.

The nut or retainer 40 comprises a sleeve 42 having a first end 43 and a second end 44, with the first end of the sleeve defining a first aperture 48. A collar 50 is located at the second end of the sleeve, with the collar comprising a first contacting surface 52, a second contacting surface 56 and a land 54 which extends therebetween. The land 54 defines a second aperture 58. The nut or retainer 40 includes means for releasably engaging a tube 46 configured as threads.

A typical pipe or tube "P" with an end portion configured as a nipple "N" which is to be closed off has an interior surface "S1," an outer surface "S2", a transition between the interior and exterior surfaces "S3," a substantially cylindrical circumferential sealing surface portion "S4" and threads as a means for coupling the tube to other articles "T". Alternate means could include one or more protrusions on one of either the retainer 40 or the tube and cooperating spiraled grooves on the other.

As depicted in FIG. 2, annular skirt 24 of cap 20 has an interior surface 25 and an exterior surface 29, and is sized so that the interior surface 25 of skirt 24 is slightly smaller in diameter that the exterior surface of a tube S2 to be closed. This results in an interference fit between the exterior surface of a tube S2 and the interior surface of the cap 25, which effectively seals off a pipe or tube end. Although skirt 24, as depicted, fits over a tube end, it is understood that skirt 24 could also be sized to fit into the interior of the tube S1 so that there is an interference fit between the exterior surface of the skirt 29 and the interior surface of the tube S1 to be closed off. First annular ring 26 of end section 22 is integral with annular skirt 24, and projects inwardly therefrom. Note that the angle of projection of first annular ring 26 matches transition surface S3 of the pipe or tube, and aids in closure of the tube.

The second annular ring 28 of the end section 22 is integral with the first annular ring 26 and generally extends therefrom along the longitudinal axis of skirt 24. Note that the longitudinal extent of second annular ring 28 is greater than the longitudinal extent of land 54 of collar 50. The third annular ring 30 of end section 22 is integral with second annular ring 28 and also generally extends therefrom along the longitudinal axis of skirt 24. Finally, head 38 of end section or cover 22 is integrally attached to third annular ring 30 and extends radially therefrom, essentially closing the end of the cap.

In greater detail, third annular ring 30 is preferably in the shape of a truncated cone with a head 38 having a first diameter 39a, and a tip 34 which defines a second, larger diameter 39b. A camming surface 32 extends in a generally outwardly direction from the head 38 to tip 34. Tip 34 further comprises a lifting or removal surface 36 which extends radially between the third annular ring 30 and the second annular ring 28.

The second aperture 58 of the retainer, formed by land 54 of collar 50, is larger than the diameter 39a defined by the head 38 and is smaller in diameter than the diameter formed by the tip 39b of third annular ring 30. As first contacting surface 52 and land 54 of collar 50 encounter camming surface 32 and tip 34 of third annular ring 30, tip 34 being comparatively resilient will deform elastically as the land 54 of collar 50 passes thereby. When the land 54 moves past tip 34, tip 34 will return to its undeformed state and lifting surface 36 will be juxtaposed adjacent the second contacting surface 56 of nut or retainer 40.

FIGS. 3–5 depict the interaction between the cap, the nut or retainer and a pipe or tube end as the pipe is capped, sealed, and uncapped, respectively.

In FIG. 3, a cap 20 has been attached and seated onto a pipe or tube P. Note that the transition S3 of tube P and the interior surface 27 of first annular ring 26 complement each other, and form an effective seal which extends along the interior surface 25 of skirt 24 and first annular ring 26 of cap 20. Note that when cap 20 is seated on pipe or tube end P the interior surface S2 of P makes a smooth transition to the interior surface 39 of cap 20, thus reducing cavities or spaces in which contaminants may accumulate.

FIG. 4 depicts an assembled tube closure 10, where the first contacting surface 52 of collar 50 has passed the camming surface 32 and tip 34 of third annular ring 30 and is in contact with the first annular-ring or force receiving surface 26 of cap 20. Note that tip 34 is clear of any contact with collar 50.

In FIG. 5, tube closure 10 has been removed from a pipe or tube P. Here, the second contacting surface 56 of collar 50 engages the lifting surface 36 of third annular ring 30. As the nut or retainer 40 is loosened, the second contacting surface 56 of collar 50 engages the lifting surface 36 of third annular ring 30, and lifts cap 20 out of engagement with a tube P. The force to separate the cap 20 from the tubular end portion N is less than the force to pass the lifting surface 36 past the second contacting surface 56. After the cap 20 and retainer 40 have been removed, the cap 20 may be removed from the retainer 40 by exerting enough force on cap 20 to overcome the resistance of tip 34 against the second contacting surface 56 of collar 50.

Referring to FIG. 1, the nut or retainer 40 includes a plurality of parallel ribs 60 which increase the gripability of the nut or retainer as it is tightened and loosened from pipe P.

Referring to FIG. 6, an alternative embodiment of the cap 120 is shown. Here, the first annular ring or force receiving surface 126 extends radially with respect to the longitudinal axis of skirt 124 and forms a ledge 127. With this configuration, the first contacting surface 152 of nut or retainer 40 transmits an axial force to ledge 127 as opposed to a combination of axial or radial forces with the first embodiment.

The operation of the tube closure corresponding to FIGS. 1–6 will now be discussed.

To assemble the tube closure, a correctly sized cap is selected. Then the cap is force fit onto the pipe or tube to be closed. The nut or retainer is then placed over the cap to where it begins to engage the means for detachably coupling the pipe to the retainer. As the nut or retainer is drawn toward the tube, the first contacting surface of the collar comes into contact with the camming surface and the tip of the third annular ring.

As the motion continues, the tip, being flexible and resilient, deflects and moves slidingly past the land of the collar, thereby allowing the head of the cap to pass through the second aperture defined by the collar. When the head and the shoulder move past the first contacting surface and the land of the collar, the tip springs back to its normal, unstressed condition.

After the collar moves past the camming surface and tip of the third annular ring, the first contacting surface comes into contact with the first annular ring or force receiving surface of the cap. As the retainer is drawn further toward the tube, an effective seal between the closure and the tube is formed.

To uncap the pipe or tube end, the nut or retainer is loosened from the pipe or tube in the normal fashion. As the retainer comes out of engagement with the tube, the second contacting surface of the collar comes into contact with the lifting surface of the third annular formed by the tip and the camming surface. Because the lifting surface is not preceded by a camming surface, the amount of the axial separation force needed to move the tip back past the land and through the collar is greater than the axial cap removal force needed to remove the cap from the tube. Thus, as the retainer is loosened, the second contacting surface remains in contact with the lifting surface and the cap is removed axially along with the retainer.

To disassemble the tube closure, a person need only exert a sufficient amount of force equal to or greater than the axial separation force on the head of the cap and push the cap through the second aperture.

Referring to FIG. 7, the closure operates in essentially the same manner. However, the camming surface is now part of the retainer and the relatively collinear land is now part of the third annular ring. In greater detail, collar 250 is in the shape of a truncated cone with the first contacting surface 252 having a first diameter 239a, and the second contacting surface 256 having a smaller diameter 239b and forming tip 255. A camming surface 254 extends between the first and second contacting surfaces 252, 256 in a generally radial direction relative to the longitudinal axis of the nut or retainer 240. Note that the first diameter 239a formed by the first contacting surface 252 is greater than the diameter of the head 238 of the third annular ring 230.

The corresponding third annular ring 230 is in the shape of a cylinder. The third annular ring 230 includes a lifting surface 236 which extends radially between the third annular ring 230 and the second annular ring 228.

The operation of assembling the retainer onto a cap is essentially the same as discussed above except that the interacting surfaces have been reversed. Briefly, as the camming surface and the second contacting surface of the collar encounter the third annular ring, the second contacting surface, being comparatively resilient, will deform elastically as the third annular ring passes thereby. When the third annular ring moves past the second contacting surface tip, the tip will return to its undeformed state and the lifting surface will be juxtaposed adjacent the second contacting surface.

This type of tube closure works best with complementary screw threads, but is not limited thereto.

The closure is in the preferred embodiments formed of plastics, ideally heat processable plastics such as PFA, PE, PP, FEP, PVDF, and PVC.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A closure for closing an open end of a tube, the tube having a nipple with an exterior cylindrical circumferential sealing surface, an interior surface, a transition therebetween, the tube further having a threaded portion next to the nipple and opposite the open end, the closure comprising:

a cap having an open end and a closed end, the cap comprising a skirt extending to the open end, a retaining force receiving surface, and a lifting surface, the skirt having an inwardly facing cylindrical sealing surface sized to circumferentially and sealingly engage the exterior cylindrical circumferential sealing surface, said inwardly facing cylindrical sealing surface extending to the open end, the cap further having an annular ring with an interior surface configured for sealingly engaging the transition of the nipple;

a retainer comprising an internally threaded sleeve having a first end and a second end, with the first end of the sleeve defining a first aperture, a collar extending radially from the second end of the sleeve and defining a second aperture, the collar having a first contacting surface and a second contacting surface, and threads sized to engage threaded portion; and wherein, the first contacting surface of the retainer is engageable with the force receiving surface of the cap for engaging and securing the cap to the tubular end portion, and the second contacting surface of the retainer is engageable with the lifting surface of the cap for disengaging the cap with the tubular end portion.

2. The closure of claim 1, wherein said retainer and said cap are separable from each other by an axial force greater than an axial force for disengaging the cap with the tubular end portion.

3. The closure of claim 1, wherein said closed end of the cap further comprises a camming surface engageable with and passable past the first contacting surface to facilitate insertion of the cap within the sleeve.

4. The closure of claim 1, wherein said collar further comprises a camming surface.

5. A closure for plumbing with plastic tubing, the closure comprising:

a cap having an open end and a closed end comprising a skirt defining an open space; a first annular ring extending from the skirt, the first annular ring having a force receiving surface, a second annular ring extending generally axially from the first annular ring along the longitudinal axis of the skirt, a third annular ring extending generally axially from the second annular ring along the longitudinal axis of the skirt, the third annular ring having a lifting surface, and, a head extending radially from the third annular ring, the head effectively closing the third annular ring, the first annular ring, the second annular ring and the third annular ring defining a collar receiving region, the skirt having an inner circumferential sealing surface, said sealing surface extending substantially the length of the skirt and extending to the open end;

a retainer comprising a sleeve having a first end and a second end, with the first end of the sleeve defining a first aperture, a collar extending radially inward from the second end of the sleeve and defining a second aperture, the collar having a first contacting surface and a second contacting surface;

the retainer releasably insertable on the cap with the collar positioned at the collar receiving region, wherein, the first contacting surface of the retainer is engageable with the force receiving surface of the cap, and the second contacting surface of the retainer is engageable with the lifting surface of the cap.

6. The closure of claim 5, wherein said first annular ring extends generally radially from said skirt relative to the longitudinal axis of the skirt.

7. The closure of claim 5, wherein said first annular ring extends generally radially and axially from said skirt.

8. The closure of claim 5, wherein said force engaging surface and said lifting surface of said cap are spaced apart from each other.

9. The closure of claim 5, wherein said third annular ring further comprises a camming surface.

10. The closure of claim 5, wherein said collar further comprises a land adjacent said first and said second contacting surfaces, and further wherein the land separates said first and said second contacting surfaces.

11. The closure of claim 10, wherein said land further comprises a camming surface.

12. A combination of a plastic threaded nipple for use in plumbing and a closure for said threaded nipple, the threaded nipple comprising:

an open end, a threaded portion, an exterior cylindrical circumferential sealing, an interior surface and a transition between said interior surface and the exterior cylindrical circumferential sealing surface;

the closure comprising:

a cap with an open end, a closed end, and an interior sealing surface sized to sealingly engage with the circumferential sealing surface portion of the nipple, and to be disengageable with said outer sealing surface by an axial cap removal force, an annular ring with an interior surface sealingly engageable with the transition and sealingly disengageable with said axial cap removal force, and a retainer nut having interior threads, an open first end, an open second end, and a cap engaging portion, the nut interior threads engageable with the threads on the threaded nipple with the cap engaged on said nipple whereby the cap engaging portion is engageable with the retainer nut engagement portion thereby securing the nut on said nipple;

the nut engagement portion and the cap engaging portion configured such that the nut and cap are separable from each other by providing an axial separation force, said axial separation force is in the same direction as the axial nut removing force and is greater in quantity than said axial nut removing force.

13. The combination of claim 12, wherein the nut engagement portion and the cap engaging portion are further configured such that unscrewing of the nut on the threaded nipple provides the axial cap removal force required for removing the cap from the nipple whereby when the cap is secured on the threaded nipple, the unscrewing of the retainer nut causes removal of the cap from the threaded nipple without separation of the retainer nut from the cap.

14. The combination of claim 12, wherein the circumferential sealing surface of the nipple is cylindrical and wherein the sealing surface of the cap is cylindrical.

15. A plastic pipe plumbing closure for a threaded nipple portion, the threaded nipple portion having an open end, a threaded portion, and a circumferential cylindrical sealing surface portion extending to the open end;

the closure comprising:

a cap with an open end, a closed end, and an interior cylindrical sealing surface sized to sealingly engage with substantially all of the circumferential cylindrical sealing surface of the nipple, and to be disengageable with said outer sealing surface by an axial cap removal force, and a retainer nut having interior threads, an open first end, an open second end, and a cap engaging portion, the nut interior threads engageable with the threads on the threaded nipple with the cap engaged on said nipple whereby the cap engaging portion is engageable with the retainer nut engagement portion thereby securing the nut on said nipple;

the nut engagement portion and the cap engaging portion configured such that the nut and cap are separable from each other by providing an axial separation force, said axial separation force being greater than said axial cap removing force.

* * * * *